United States Patent
Nagata

(10) Patent No.: US 9,783,184 B2
(45) Date of Patent: Oct. 10, 2017

(54) HYBRID VEHICLE WHICH SUPPLIES ELECTRIC POWER FROM AN EXTERNAL POWER SOURCE TO A ROTARY ELECTRIC MACHINE

(71) Applicant: Toyota Jidosha Kabushiki Kaisha, Toyota-shi, Aichi-ken (JP)

(72) Inventor: Shuichi Nagata, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 265 days.

(21) Appl. No.: 14/560,409

(22) Filed: Dec. 4, 2014

(65) Prior Publication Data

US 2015/0166041 A1 Jun. 18, 2015

(30) Foreign Application Priority Data

Dec. 13, 2013 (JP) ................. 2013-258290

(51) Int. Cl.
*B60W 20/00* (2016.01)
*B60L 11/12* (2006.01)
(Continued)

(52) U.S. Cl.
CPC ............ *B60W 20/00* (2013.01); *B60L 11/123* (2013.01); *B60L 11/14* (2013.01); *B60L 11/1816* (2013.01); *B60W 10/06* (2013.01); *B60W 10/08* (2013.01); *B60W 30/18054* (2013.01); *B60W 30/192* (2013.01); *B60L 2240/445* (2013.01); *B60L 2240/662* (2013.01); *B60L 2240/80* (2013.01); *B60L 2250/14* (2013.01); *B60L 2260/56* (2013.01); *Y02T 10/6217* (2013.01);
(Continued)

(58) Field of Classification Search
None
See application file for complete search history.

(56) References Cited

U.S. PATENT DOCUMENTS 6,118,237 A * 9/2000 Kikuchi ................. B60K 6/543
318/139
6,459,166 B2 * 10/2002 Yanase ..................... B60K 6/46
123/179.28

(Continued)

FOREIGN PATENT DOCUMENTS

CN  102917901 A  2/2013
JP  2007-315290 A  12/2007
(Continued)

OTHER PUBLICATIONS

Machine Translation of KR 20080019815 A.*

*Primary Examiner* — Navid Ziaeianmehdizadeh
(74) *Attorney, Agent, or Firm* — Dinsmore & Shohl LLP

(57) ABSTRACT

A vehicle includes an engine, a rotary electric machine, an electric storage device, and a controller. The rotary electric machine is connected to an output shaft of the engine. The electric storage device is configured to supply electric power to a drive source of the vehicle and to be charged with electric power from an external power source. The external power source is disposed outside the vehicle. The controller is configured to supply the electric power from the external power source to the rotary electric machine such that the output shaft is rotated when the electric storage device is chargeable with the electric power from the external power source.

14 Claims, 4 Drawing Sheets

(51) Int. Cl.

| | | |
|---|---|---|
| *B60L 11/14* | (2006.01) | |
| *B60L 11/18* | (2006.01) | |
| *B60W 10/06* | (2006.01) | |
| *B60W 10/08* | (2006.01) | |
| *B60W 30/18* | (2012.01) | |
| *B60W 30/192* | (2012.01) | |

(52) U.S. Cl.
CPC ........ *Y02T 10/6269* (2013.01); *Y02T 10/6286* (2013.01); *Y02T 10/7005* (2013.01); *Y02T 10/7072* (2013.01); *Y02T 10/7077* (2013.01); *Y02T 10/7291* (2013.01); *Y02T 90/14* (2013.01); *Y02T 90/16* (2013.01); *Y10S 903/903* (2013.01)

(56) References Cited

U.S. PATENT DOCUMENTS

| | | | | |
|---|---|---|---|---|
| 6,612,386 | B2 * | 9/2003 | Tamai ........................ | B60K 6/48 180/65.25 |
| 9,233,614 | B2 * | 1/2016 | Imamura .................... | B60L 1/08 |
| 9,428,179 | B2 * | 8/2016 | Kato ........................... | B60W 20/10 |
| 9,431,688 | B2 * | 8/2016 | Schwarz .................... | H01M 10/625 |
| 2008/0275600 | A1 * | 11/2008 | Rask ........................... | B60K 6/24 701/22 |
| 2009/0255493 | A1 | 10/2009 | Ichimoto | |
| 2009/0277702 | A1 * | 11/2009 | Kanada ................... | B60K 6/365 180/65.29 |
| 2011/0213521 | A1 * | 9/2011 | Ito ............................ | B60K 6/46 701/22 |
| 2012/0101676 | A1 * | 4/2012 | Ichioka ................... | B60K 6/445 701/22 |
| 2012/0318783 | A1 | 12/2012 | Kamachi | |
| 2013/0030637 | A1 * | 1/2013 | Yamamoto ............. | B60K 6/445 701/22 |
| 2013/0035815 | A1 * | 2/2013 | Ando ..................... | B60K 6/445 701/22 |
| 2013/0099741 | A1 * | 4/2013 | Shimizu ............... | B60L 11/1809 320/109 |
| 2015/0083079 | A1 * | 3/2015 | Li .......................... | F02D 31/001 123/350 |
| 2015/0094894 | A1 * | 4/2015 | Ito ............................. | B60L 1/02 701/22 |
| 2015/0175157 | A1 * | 6/2015 | Teraya ..................... | F01L 1/34 701/22 |

FOREIGN PATENT DOCUMENTS

| | | |
|---|---|---|
| JP | 2009-065727 A | 3/2009 |
| JP | 2011-178181 A | 9/2011 |
| JP | 2013-005520 A | 1/2013 |
| KR | 20080019815 A * | 3/2008 |

* cited by examiner

HYBRID VEHICLE WHICH SUPPLIES ELECTRIC POWER FROM AN EXTERNAL POWER SOURCE TO A ROTARY ELECTRIC MACHINE

INCORPORATION BY REFERENCE

The disclosure of Japanese Patent Application No. 2013-258290 filed on Dec. 13, 2013 including the specification, drawings and abstract is incorporated herein by reference in its entirety.

BACKGROUND OF THE INVENTION

1. Field of the Invention

The present invention relates to a vehicle on which an engine, a rotary electric machine connected to the engine, and an electric storage device chargeable with an external power source are mounted.

2. Description of Related Art

As disclosed in Japanese Patent Application Publication No. 2013-005520 (JP 2013-005520 A), a technique of raising the temperature of an onboard battery by supplying electric power from an external power source to a heater disposed in the vicinity of the onboard battery at low temperatures is known.

SUMMARY OF THE INVENTION

In a hybrid vehicle that is chargeable with electric power from an external power source (externally chargeable) and on which an engine and a rotary electric machine is mounted, there is a possibility that the friction loss of the engine when standing alone will increase at low temperatures. When the friction loss of the engine is high and the vehicle is used after the external charging finishes, a shock may be generated at the time of starting the engine, the end of starting of the engine may be delayed, or the fuel efficiency may decrease when the engine is operated. These problems are not considered in JP 2013-005520 A.

The invention is made to solve the above-mentioned problems and an object thereof is to provide a hybrid vehicle that can suppress an increase in friction loss of an engine when standing alone.

According to an aspect of the invention, there is provided a vehicle including an engine, a rotary electric machine, an electric storage device, and a controller. The rotary electric machine is connected to an output shaft of the engine. The electric storage device is configured to supply electric power to a drive source of the hybrid vehicle and to be chargeable with electric power from an external power source. The external power source is disposed outside the hybrid vehicle. The controller is configured to supply the electric power from the external power source to the rotary electric machine such that the output shaft is rotated when the electric storage device is chargeable with the electric power from the external power source.

According to this configuration, it is possible to supply the electric power from the external power source to the rotary electric machine such that the output shaft is rotated when the electric storage device is chargeable with the electric power from the external power source. Accordingly, it is possible to rotate the output shaft of the engine without consuming the electric power from the electric storage device. Hydraulic oil in the engine is agitated by rotating the output shaft of the engine. Accordingly, the hydraulic oil is supplied to sliding positions of movable parts of the engine and thus the movable positions can be lubricated with the supplied hydraulic oil. Since the temperature of the hydraulic oil rises, it is possible to improve the viscosity of the hydraulic oil. As a result, it is possible to suppress an increase in friction loss of the engine when standing alone.

In the aspect, the controller may be configured to finish charging of the electric storage device with the electric power from the external power source at a charging finish time and to supply the electric power from the external power source to the rotary electric machine such that rotation of the output shaft is started at a time prior by a predetermined time to the charging finish time. The charging finish time may be a time at which the charging of the electric storage device with the electric power from the external power source is finished.

There is a high possibility that the vehicle will be used after the charging finish time passes. Accordingly, the electric power from the external power source is supplied to the rotary electric machine such that the rotation of the output shaft is started at the time prior by the predetermined time to the charging finish time. As a result, it is possible to prevent the hydraulic oil from running out at the sliding positions of the movable parts of the lubricated engine before the vehicle is used.

In the aspect, the charging finish time may be a time set in advance in the hybrid vehicle.

In the aspect, the charging finish time may be a time set by a user.

In the aspect, the controller may be configured to finish charging of the electric storage device with the electric power from the external power source at a charging finish time, and to supply the electric power from the external power source to the rotary electric machine such that the output shaft is rotated when the charging finish time is set by a user and the electric storage device is chargeable with the electric power from the external power source.

When the charging finish time is set by the user, there is a high possibility that the vehicle will be used after the charging finish time passes. Accordingly, it is possible to prevent the hydraulic oil from running out at the sliding positions of the movable parts of the lubricated engine before the vehicle is used.

In the aspect, the controller may be configured to stop supply of electric power to the rotary electric machine at a charging finish time.

There is a high possibility that the vehicle will be used after the charging finish time passes. Accordingly, it is possible to prevent discomfort from being given to the user of the vehicle due to the state in which the rotary electric machine is being operated, by stopping the supply of electric power to the rotary electric machine at the charging finish time.

In the aspect, the hybrid vehicle may further include a first detector. The first detector is configured to detect a temperature of the engine. The controller may be configured to supply the electric power from the external power source to the rotary electric machine such that the output shaft is rotated when the electric storage device is chargeable with the electric power from the external power source and temperature of the engine is lower than a threshold value. The temperature of the engine is detected by the first detector.

When the electric storage device is chargeable with the electric power from the external power source and the temperature of the engine is lower than the threshold value, there is a high possibility that the friction loss of the engine will increase. Accordingly, by supplying the electric power from the external power source to the rotary electric machine such that the output shaft is rotated, it is possible to lubricate the sliding positions of the movable parts of the engine and to suppress an increase in friction loss of the engine.

In the aspect, the controller may be configured to supply the electric power from the external power source to the rotary electric machine such that the output shaft is rotated when the electric storage device is chargeable with the electric power from the external power source and a predetermined time elapses after the engine is stopped.

When the predetermined time passes after the engine is stopped, there is a high possibility that the friction loss of the engine will increase. Accordingly, by supplying the electric power from the external power source to the rotary electric machine such that the output shaft is rotated, it is possible to lubricate the sliding positions of the movable parts of the engine and to suppress an increase in friction loss of the engine.

In the aspect, the hybrid vehicle may further include a second detector. The second detector is configured to detect a temperature of the electric storage device. The controller may be configured to supply the electric power from the external power source to the rotary electric machine such that the output shaft is rotated when the electric storage device is chargeable with the electric power from the external power source and the temperature of the electric storage device is higher than a threshold value. The controller may be configured to supply electric power from the electric storage device to the rotary electric machine such that the output shaft is rotated when the electric storage device is chargeable with the electric power from the external power source and the temperature of the electric storage device is lower than the threshold value. The temperature of the electric storage device is detected by the second detector.

When the temperature of the electric storage device is lower than the threshold value, it is possible to discharge the electric storage device by supplying the electric power from the electric storage device to the rotary electric machine the output shaft is rotated. Accordingly, it is possible to raise the temperature of the electric storage device. By lowering the state of charge (SOC) of the electric storage device by discharging the electric storage device, it is possible to improve a charging accepting characteristic at low temperatures.

In the aspect, the hybrid vehicle may further include an air conditioner. The air conditioner is configured to adjust a temperature of an interior of the hybrid vehicle. The controller may be configured to supply at least one of the electric power from the external power source or electric power supplied from the electric storage device to the rotary electric machine such that the output shaft is rotated depending on the state of the electric storage device when the electric storage device is chargeable with the electric power from the external power source and the air conditioner is operated along with the rotary electric machine.

When the air conditioner is operated along with the rotary electric machine, at least one of the electric power from the external power source or the electric power supplied from the electric storage device is supplied to the rotary electric machine depending on the state of the electric storage device. By rotating the output shaft in this way, it is possible to appropriately supply electric power to the rotary electric machine.

In the aspect, the controller may be configured to supply at least one of the electric power from the external power source or electric power supplied from the electric storage device to the rotary electric machine such that the output shaft is rotated depending on power supply capability from the external power source when the electric storage device is chargeable with the electric power from the external power source.

At least one of the electric power from the external power source or the electric power supplied from the electric storage device is supplied to the rotary electric machine such that the output shaft is rotated depending on the power supply capability from the external power source. Accordingly, even when the power supply capability from the external power source varies, it is possible to appropriately supply electric power to the rotary electric machine.

According to the invention, it is possible to supply the electric power from the external power source to the rotary electric machine such that the output shaft is rotated when the electric storage device is chargeable with the electric power from the external power source. Accordingly, it is possible to rotate the output shaft of the engine without consuming the electric power from the electric storage device. Hydraulic oil in the engine is agitated by rotating the output shaft of the engine. Accordingly, the hydraulic oil is supplied to sliding positions of movable parts of the engine and thus the movable positions can be lubricated with the supplied hydraulic oil. Since the temperature of the hydraulic oil rises, it is possible to improve the viscosity of the hydraulic oil. As a result, it is possible to provide a hybrid vehicle that can suppress an increase in friction loss of the engine when standing alone.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings. In the description below, like elements are referenced by like reference signs. Names and functions thereof are equal to each other. Therefore, detailed description thereof will not be repeated.

Figure 1:
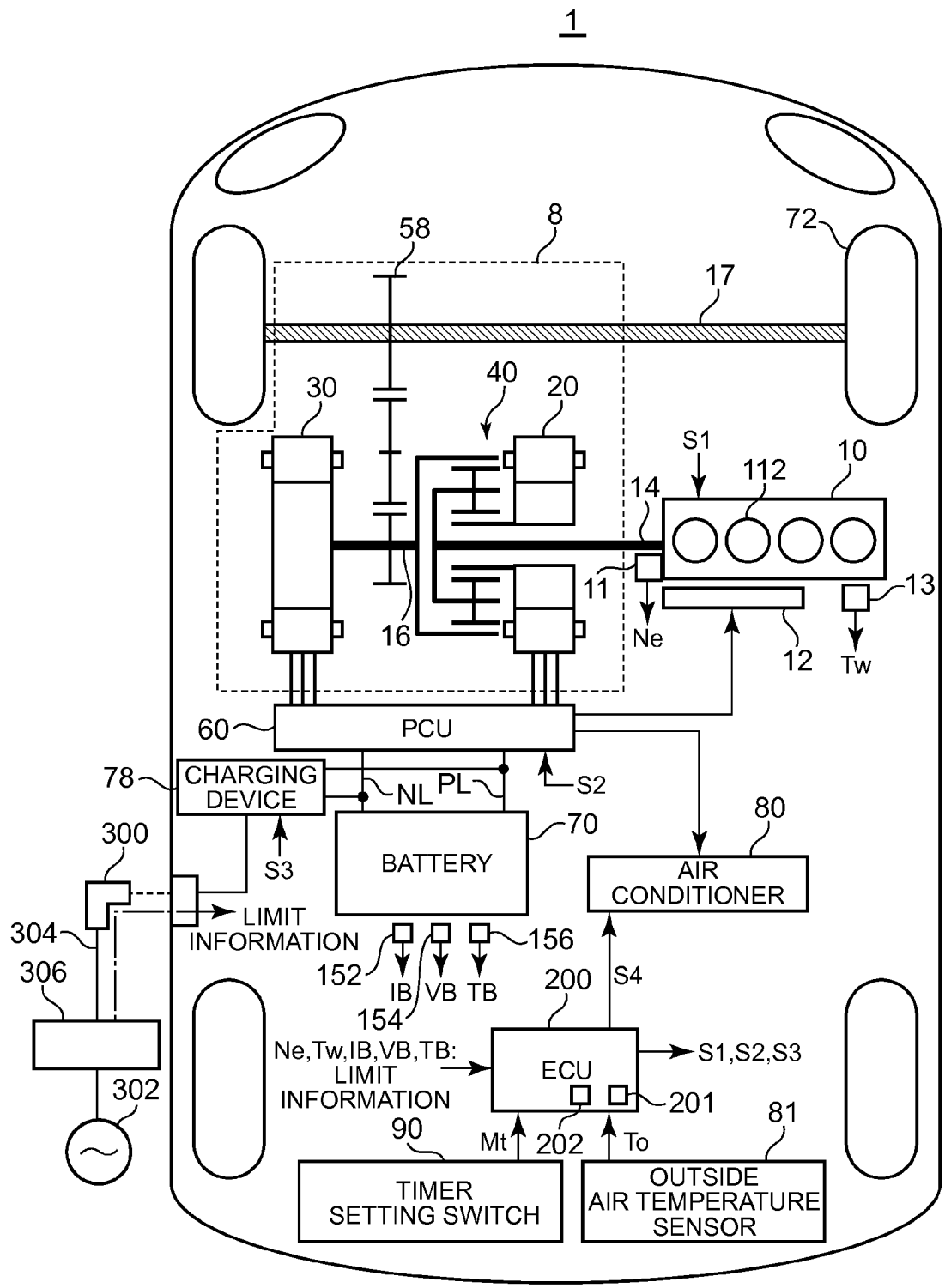
FIG. 1 is a block diagram illustrating an entire configuration of a vehicle.

An entire block diagram of a hybrid vehicle 1 (hereinafter, simply referred to as vehicle 1) according to this embodiment will be described below with reference to FIG. 1. The vehicle 1 includes a transmission 8, an engine 10, a heating device 12, a drive shaft 17, a power control unit (PCU) 60, a battery 70, driving wheels 72, a charging device 78, and electronic control unit (ECU) 200.

The transmission 8 includes a first output shaft 14, a second output shaft 16, a first motor-generator set (hereinafter, referred to as first MG) 20, a second motor-generator set (hereinafter, referred to as second MG) 30, a power distribution unit 40, and a reduction gear unit 58.

The ECU 200 is connected to an engine rotation speed sensor 11, a coolant temperature sensor 13, an outside air temperature sensor 81, a current sensor 152, a voltage sensor 154, and a battery temperature sensor 156 so as to receive various signals from the sensors. The ECU 200 is connected to a timer setting switch 90 so as to receive an operation signal Mt therefrom.

The vehicle 1 having this configuration runs with the drive force output from at least one of the engine 10 or the second MG 30. The power generated from the engine 10 is distributed into two paths by the power distribution unit 40. One path of the two paths is a path through which the power is transmitted to the driving wheels 72 via the reduction gear unit 58 and the other path is a path through which the power is transmitted to the first MG 20.

The first MG 20 and the second MG 30 are, for example, three-phase AC rotary electric machines. The first MG 20 and the second MG 30 are driven by the PCU 60.

The first MG 20 has a function as a generator (power generator) generating electric power using the power from the engine 10 distributed by the power distribution unit 40 and charging the battery 70 via the PCU 60. The first MG 20 receives electric power from the battery 70 and rotates the first output shaft 14 (crank shaft) of the engine 10. Accordingly, the first MG 20 has a function as a starter starting the engine 10.

The second MG 30 has a function as a driving motor applying a drive force to the driving wheels 72 using at least one of the electric power stored in the battery 70 or the electric power generated from the first MG 20. The second MG 30 has a function as a generator charging the battery 70 via the PCU 60 using the electric power generated by regenerative braking.

The engine 10 includes plural cylinders 112. The top portion in each cylinder 112 is provided with an ignition plug (not illustrated). The engine 10 is provided with a fuel injector (not illustrated) corresponding to each cylinder 112 in each cylinder or an intake port. The engine 10 is not particularly limited to an in-line four-cylinder engine, but may be a diesel engine or a gasoline engine. The engine 10 is a gasoline engine and is controlled on the basis of a control signal S1 from the ECU 200.

The heating device 12 raises the temperature of the engine 10 using the electric power. The heating device 12 may be a heater disposed, for example, in contact with an engine block of the engine 10 and directly raising the temperature of the engine 10. The heating device 12 may include a heater disposed in a passage of a coolant of the engine 10 so as to heat the coolant and an electric pump circulating the coolant of the engine 10.

The engine rotation speed sensor 11 is disposed in the engine 10 and detects a rotation speed (hereinafter, referred to as engine rotation speed) Ne of the first output shaft 14 of the engine 10. The engine rotation speed sensor 11 transmits a signal indicating the detected engine rotation speed Ne to the ECU 200.

The coolant temperature sensor 13 is disposed in the engine 10 and detects the temperature Tw of the coolant flowing in the engine 10 (hereinafter, referred to as coolant temperature Tw). The coolant temperature sensor 13 transmits a signal indicating the detected coolant temperature Tw to the ECU 200.

The power distribution unit 40 is configured to distribute the power generated from the engine 10 to the path extending to the driving shafts 17 via the second output shaft 16 and the path extending to the first MG 20. The power distribution unit 40 can employ a planetary gear mechanism having three rotation shafts of a sun gear, a planetary gear, and a ring gear. For example, a rotor of the first MG 20 is connected to the sun gear, the first output shaft 14 of the engine 10 is connected to the planetary gear, and the second output shaft 16 is connected to the ring gear. By this configuration, the engine 10, the first MG 20, and the second MG 30 can be mechanically connected to the power distribution unit 40.

The second output shaft 16 connected to a rotor of the second MG 30 is connected to the drive shaft 17 for rotationally driving the driving wheels 72 via the reduction gear unit 58. A transmission may be further disposed between the rotation shaft of the second MG 30 and the second output shaft 16.

The PCU 60 converts DC power supplied from the battery 70 into AC power and drives the first MG 20 and the second MG 30. The PCU 60 converts AC power generated from the first MG 20 and the second MG 30 into DC power and charges the battery 70 with the power. For example, the PCU 60 is configured to include an inverter (not illustrated) for DC/AC power conversion and a converter (not illustrated) for DC voltage conversion between the DC link side of the inverter and the battery 70. When receiving an operation request of the air conditioner 80 or the heating device 12 from the ECU 200, the PCU 60 supplies electric power to the air conditioner 80 or the heating device 12 in response to the operation request.

The battery 70 is an electric storage device and is a DC power source rechargeable. For example, a secondary battery of nickel hydrogen or lithium ions is used as the battery 70. The voltage of the battery 70 is, for example, about 200 V. For example, the battery 70 is charged with the electric power generated from the first MG 20 and/or the second MG 30. In addition, the battery 70 may be charged with electric power supplied from an external power source (not illustrated). The battery 70 is not limited to the secondary battery, but may be, for example, a capacitor, a solar cell battery, or a fuel battery as long as it can generate a DC voltage.

The battery 70 is provided with a current sensor 152, a voltage sensor 154, and a battery temperature sensor 156. The current sensor 152 detects a current IB of the battery 70. The current sensor 152 transmits a signal indicating the detected current IB to the ECU 200. The voltage sensor 154 detects a voltage VB of the battery 70. The voltage sensor 154 transmits a signal indicating the detected voltage VB to the ECU 200. The battery temperature sensor 156 detects a battery temperature TB of the battery 70. The battery temperature sensor 156 transmits a signal indicating the detected battery temperature TB to the ECU 200.

The ECU 200 estimates the state of charge (hereinafter, referred to as SOC) of the battery 70 on the basis of the current IB, the voltage VB, and the battery temperature TB of the battery 70. The ECU 200 may estimate an open circuit voltage (OCV), for example, on the basis of the current IB, the voltage VB, and the battery temperature TB, and may estimate the SOC of the battery 70 on the basis of the estimated OCV and a predetermined map. Alternatively, the ECU 200 may estimate the SO of the battery 70, for example, by integrating a charging current and a discharging current of the battery 70.

The charging device 78 charges the battery 70 with the electric power supplied from an external power source 302 when a charging plug 300 is attached to the vehicle 1 while the vehicle 1 stops. The charging plug 300 is connected to one end of a charging cable 304. The other end of the charging cable 304 is connected to the external power source 302 via a power management system 306. The positive electrode terminal of the charging device 78 is connected to a power line PL connecting the positive electrode terminal of the PCU 60 and the positive electrode terminal of the battery 70. The negative electrode terminal of the charging device 78 is connected to an earth line NL connecting the negative electrode terminal of the PCU 60 and the negative electrode terminal of the battery 70. In addition to or instead of a charging method of supplying electric power from the external power source 302 to the battery 70 of the vehicle 1 by contacting supply of power using the charging plug 300 and the like, a charging method of supplying electric power from the external power source 302 to the battery 70 of the vehicle 1 by non-contacting supply of power such as resonance or electromagnetic induction. The external power source 302 is, for example, a commercially-available power source. The ECU 200 waits for charging of the battery 70 when a charging start time to be described later is set and the charging plug 300 is attached to the vehicle 1.

Plural electrical apparatuses including the vehicle 1 are connected to the power management system 306. The power management system 306 is disposed, for example, in a building such as a house. The electrical apparatuses are disposed inside or outside of a building and are household electrical apparatuses. The power management system 306 manages an amount of power used (power consumption) of the electrical apparatuses including the vehicle 1. For example, the power management system 306 may limit use of electric power from a specific electrical apparatus depending on the use states of the respective electrical apparatuses including the vehicle 1. For example, when an amount of power capable of being supplied to the vehicle 1 is limited, the power management system 306 transmits limit information indicating that the possible amount of power is limited to the ECU 200. Alternatively, information such as the limited amount of power is transmitted as the limit information to the ECU 200. The power management system 306 and the ECU 200 may communicate with each other in a wired communication manner using the charging cable 304 or a wireless communication manner.

The air conditioner 80 ventilates the interior of the vehicle 1 or performs any one of cooling and heating so that the temperature of the interior of the vehicle 1 reaches a target value.

The outside air temperature sensor 81 detects an outside temperature To (hereinafter, referred to as outside air temperature To) of the vehicle 1. The outside air temperature sensor 81 transmits a signal indicating the detected outside air temperature To to the ECU 200.

The timer setting switch 90 is an operation member used for a user to reserve charging of the battery 70 with the external power source 302 in a timer. The timer setting switch 90 may be, for example, a button or a rotary switch. The user of the vehicle 1 operates the timer setting switch 90 to input a charging start time or a charging finish time of the battery 70.

The ECU 200 generates a control signal to be controlled out of a control signal S1 for controlling the engine 10, a control signal S2 for controlling the PCU 60, a control signal S3 for controlling the charging device 78, a control signal S4 for controlling the air conditioner 80, and a control signal S5 for controlling the heating device 12 and outputs the generated control signal to a control target.

The ECU 200 is a controller that controls the entire hybrid system, that is, charging and discharging states of the battery 70 and operation states of the engine 10, the first MG 20, and the second MG 30, so as to most efficiently operate the vehicle 1 by controlling the engine 10, the PCU 60, and the like.

The ECU 200 includes a memory 201 and a timer 202. When the user inputs the charging start time or the charging finish time using the timer setting switch 90, the ECU 200 stores the input charging start time or charging finish time in the memory 201.

The ECU 200 acquires the current time from the timer 202. The timer 202 is, for example, a radio-controller timepiece, and may count the current time on the basis of a time synchronized with radio waves received from the outside. Alternatively, the timer 202 may count the current time on the basis of the time adjusted by the user.

When the current time acquired, for example, by the timer 202 passes through the charging start time and the charging plug 300 is attached to a predetermined position of the vehicle 1, the ECU 200 controls the charging device 78 so as to start the charging of the battery 70 with the electric power from the external power source 302 (hereinafter, referred to as external charging). Whether the charging plug 300 is attached may be detected, for example, using a sensor detecting whether the charging plug 300 is attached. When a predetermined signal is received from the power management system 306 via the charging plug 300, it may be determined that the charging plug 300 is attached.

The ECU 200 controls the charging device 78 so as to stop the charging with the electric power from the external power source 302, for example, when the current time acquired from the timer 202 passes through the charging finish time while the battery 70 is charged with the electric power from the external power source 302.

In the vehicle 1 having the above-mentioned configuration, there is a possibility that the hydraulic oil runs out at the sliding positions of the movable parts of the engine 10 when standing alone and thus the friction loss of the engine 10 will increase at low temperatures. When the friction loss of the engine 10 is high and the vehicle 1 is used after the external charging finishes, a shock may be generated at the time of starting the engine 10, the starting finish of the engine 10 may be delayed, or the fuel efficiency may degrade after the engine 10 is operated. Particularly, at ultralow temperatures, these phenomena occur when the EV driving in which the vehicle runs using only the second MG 30 is limited and the operation (warm-up) of the engine 10 has priority.

Therefore, this embodiment is characterized in that the ECU 200 supplies the electric power from the external power source 302 to the first MG 20 to rotate the first output shaft 14 of the engine 10 when the battery 70 is chargeable with the electric power from the external power source 302. In the below description, the control of operating the first MG 20 to rotate the first output shaft 14 of the engine 10 is referred to as motoring control.

In this embodiment, the ECU 200 supplies the electric power from the external power source 302 to the first MG 20 to perform the motoring control when the coolant temperature Tw is lower than a threshold value A at a time point prior by a predetermined time to the charging finish time set by the user. The ECU 200 stops the supply of electric power to the first MG 20 when the current time passes through the charging finish time of the battery 70. The threshold value A is, for example, a value with which the shock at the time of starting, the delay of the starting finish, or the degradation of the fuel efficiency during the operation is not generated to such an extent to give discomfort to the user or it can be determined that the warming-up progresses to an extent to rapidly solve such a problem.

In this embodiment, the ECU 200 controls the heating device 12 so as to raise the temperature of the engine 10 at the time point prior to the charging finish time. The ECU 200 starts the operation of the heating device 12 so that the coolant temperature Tw at the charging finish time is equal to or higher than a threshold value B. The ECU 200 may determine an operation time of the heating device 12 on the basis of the difference between the current coolant temperature Tw and the threshold value B and may start the operation of the heating device 12 at the time point prior by the operation period to the charging finish time. The threshold value B is, for example, a value with which it can be determined that the warming-up of the engine 10 finishes or a value with which it can be determined that the warming-up of the engine 10 progresses to a predetermined extent, and is a value greater than the threshold value A. In this embodiment, the above-mentioned predetermined time is described to be the operation period of the heating device 12.

Figure 2:
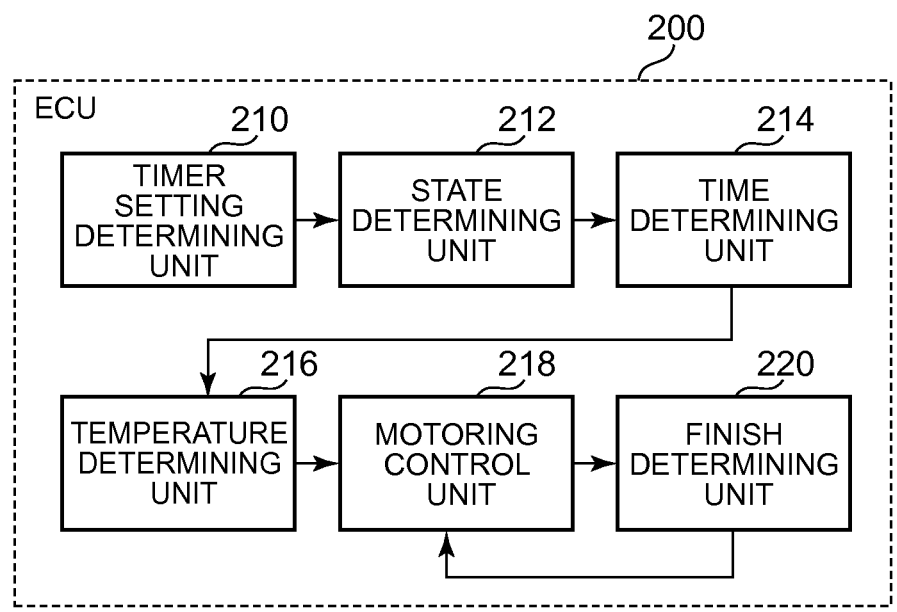
FIG. 2 is a functional block diagram illustrating an ECU.

FIG. 2 is a functional block diagram of the ECU 200 mounted on the vehicle 1 according to this embodiment. The ECU 200 includes a timer setting determining unit 210, a state determining unit 212, a time determining unit 214, a temperature determining unit 216, a motoring control unit 218, and a finish determining unit 220.

The timer setting determining unit 210 determines whether the charging finish time of the charging with the electric power from the external power source 302 is set. The timer setting determining unit 210 determines that the charging finish time is set, for example, when the charging finish time is stored in the memory 201. The timer setting determining unit 210 may set a timer setting determination flag to an ON state, for example, when it is determined that the charging finish time is set.

The state determining unit 212 determines whether the supply of electric power from the external power source 302 is possible (whether the external charging is possible). Specifically, the state determining unit 212 may determine that the supply of electric power from the external power source 302 is possible when the charging plug 300 is attached to the vehicle 1. The determination of whether the charging plug 300 is attached to the vehicle 1 is the same as described above and thus detailed description thereof will not be repeated. The state determining unit 212 may set a state determination flag to an ON state when it is determined that the supply of electric power from the external power source 302 is possible.

The time determining unit 214 determines whether the current time passes through a time point (hereinafter, also referred to as a motoring start time) prior by a predetermined time to the charging finish time, when the timer setting determining unit 210 determines that the charging finish time is set.

The time determining unit 214 may determine whether the current time passes through the motoring start time, for example, when the timer setting determination flag is in the ON state, and may set a time determination flag to an ON state when it is determined that the current time passes through the motoring start time.

The temperature determining unit 216 determines whether the coolant temperature Tw is equal to or lower than the threshold value A. The temperature determining unit 216 may set a temperature determination flag to an ON state, for example, when it is determined that the coolant temperature Tw is equal to or lower than the threshold value A.

The motoring control unit 218 performs the motoring control when the timer setting determining unit 210 determines that the charging finish time is set, the state determining unit 212 determines that the supply of electric power from the external power source 302 is possible, the time determining unit 214 determines that the current time passes through the motoring start time, and the temperature determining unit 216 determines that the coolant temperature Tw is equal to or lower than the threshold value A.

The motoring control unit 218 raises the engine rotation speed Ne to a target rotation speed. The motoring control unit 218 maintains the engine rotation speed Ne after the engine rotation speed Ne is raised to the target rotation speed.

The target rotation speed is not particularly limited, and it is preferable that the target rotation speed be set to such a rotation speed not to generate noise capable of giving discomfort to the driver due to the motoring and a rotation speed at which lubrication is appropriately carried out. The target rotation speed is, for example, a rotation speed of the same extent as the cranking of the engine 10.

The motoring control unit 218 finishes the motoring control when the finish determining unit 220 to be described later determines that the motoring finishes.

The motoring control unit 218 performs the motoring control, for example, when all of the timer setting determination flag, the state determination flag, the time determination flag, and the temperature determination flag are in the ON state. The motoring control unit 218 finishes the motoring control when a finish determination flag to be described later is set to an ON state. The motoring control unit 218 finishes the motoring control and sets the finish determination flag to the OFF state.

The finish determining unit 220 determines whether to finish the motoring control. The finish determining unit 220 determines that the motoring control is finished, for example, when the current time passes through the charging finish time. Alternatively, the finish determining unit 220 determines that the motoring control is finished when the coolant temperature Tw is equal to or higher than the threshold value B.

The finish determining unit 220 may start the determination of whether to finish the motoring control when the motoring control is performed by the motoring control unit 218 and may set the finish determination flag to the ON state when it is determined that the motoring control is finished.

Figure 3:
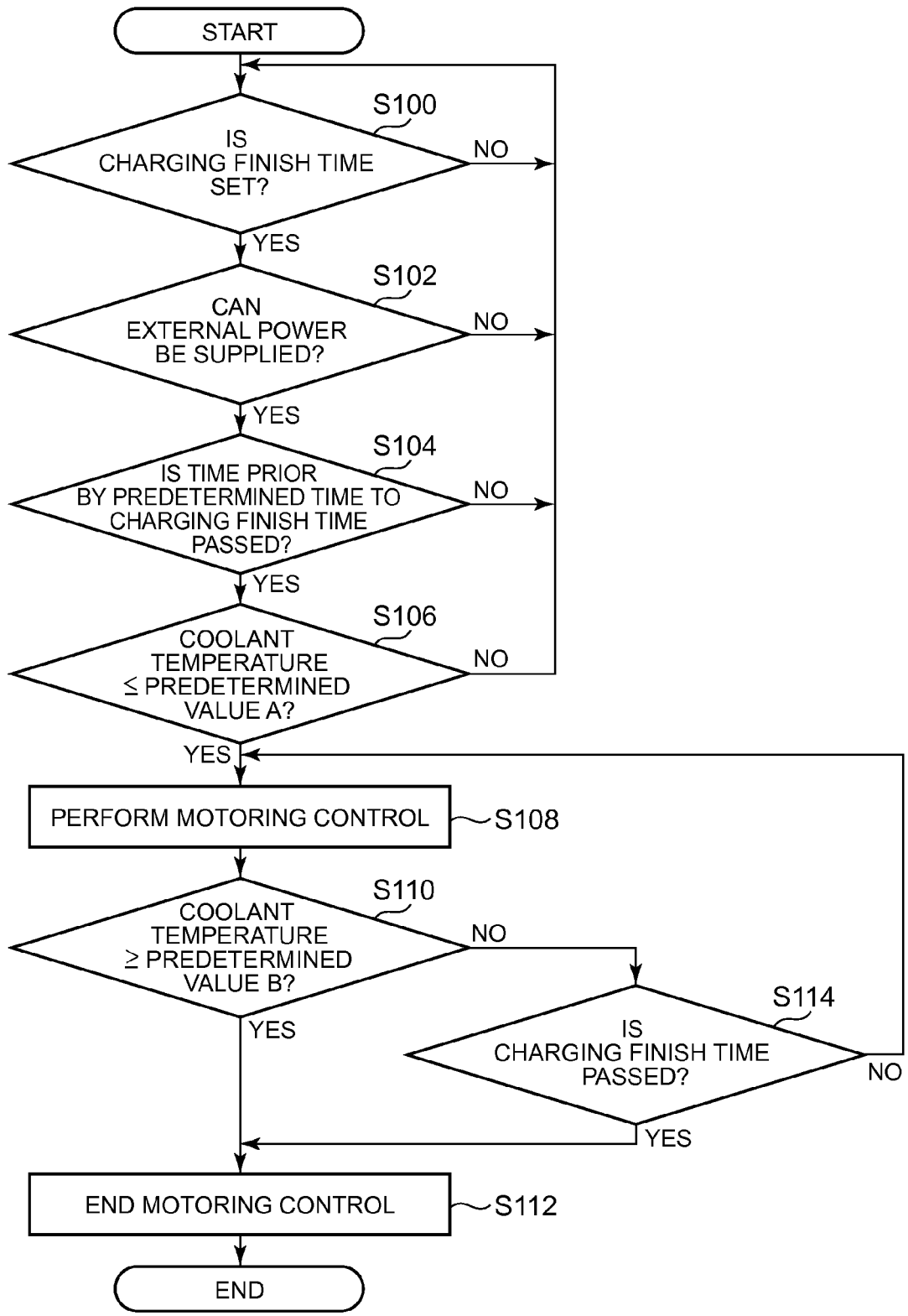
FIG. 3 is a flowchart illustrating a control process that is performed by the ECU.

A flow of the control process that is performed by the ECU 200 mounted on the vehicle 1 according to this embodiment will be described below with reference to FIG. 3.

In step (hereinafter, step is referred to as S) 100, the ECU 200 determines whether the charging finish time is set. When the charging finish time is set (YES in S100), the process flow moves to S102. Otherwise (NO in S100), the process flow returns to S100.

In S102, the ECU 200 determines whether the supply of electric power from the external power source 302 is possible. When it is determined that the supply of electric power from the external power source 302 is possible (YES in S102), the process flow moves to S104. Otherwise (NO in S102), the process flow returns to S100.

In S104, the ECU 200 determines whether the current time passes through the motoring start time prior by the predetermined time to the charging finish time. When it is determined that the current time passes through the motoring start time (YES in S104), the process flow moves to S106. Otherwise (NO in S104), the process flow returns to S100.

In S106, the ECU 200 determines whether the coolant temperature Tw is equal to or lower than the threshold value A. When it is determined that the coolant temperature Tw is equal to or lower than the threshold value A (YES in S106), the process flow moves to S108. Otherwise (NO in S106), the process flow returns to S100.

In S108, the ECU 200 performs the motoring control. In S110, the ECU 200 determines whether the coolant temperature Tw is equal to or higher than the threshold value B. When it is determined that the coolant temperature Tw is equal to or higher than the threshold value B (YES in S110), the process flow moves to S112. Otherwise (NO in S110), the process flow moves to S114.

In S112, the ECU 200 finishes the motoring control. In S114, the ECU 200 determines whether the current time passes through the charging finish time. When it is determined that the current time passes through the charging finish time (YES in S114), the process flow moves to S112. Otherwise (NO in S114), the process flow returns to S108.

Figure 4:
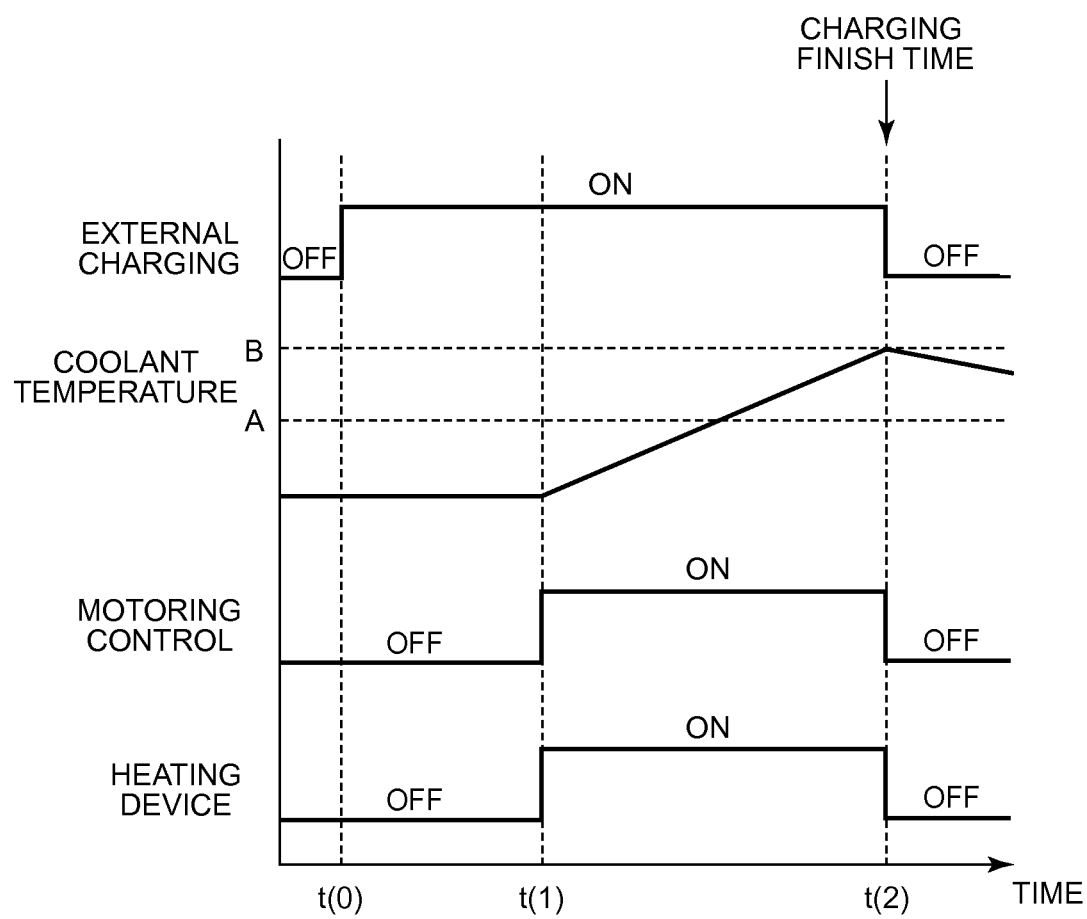
FIG. 4 is a timing chart illustrating operations of the ECU.

The operations of the ECU 200 mounted on the vehicle 1 according to this embodiment based on the above-mentioned structure and the above-mentioned flowchart will be described below with reference to FIG. 4.

For example, it is assumed that the charging plug 300 is attached to the vehicle 1 at time t(0) and the charging of the battery 70 with the external power source 302 is started (when the external charging is turned on). It is also assumed that the user operates the timer setting switch 90 to set the charging finish time to time t(2) (YES in S100).

At time t(0), when the supply of electric power from the external power source 302 is possible and the charging of the battery 70 is started (YES in S102), the electric power from the external power source 302 is supplied to the battery 70 via the charging plug 300 and the charging device 78 and thus the SOC of the battery 70 increases with the lapse of time.

At time t(1), when the motoring start time prior by the predetermined time to the charging finish time passes (YES in S104), the operation of the heating device 12 is started (the heating device 12 is changed to the ON state) and the motoring control is performed (S108) because the coolant temperature Tw is equal to or lower than the threshold value (YES in S106). Accordingly, the motoring control is switched from the OFF state to the ON state.

Since the operation of the heating device 12 is started, the coolant temperature Tw rises with the lapse of time after time T(1). Since the motoring control is performed, a rotational force is applied from the first MG 20 to the first output shaft 14 of the engine 10 and thus the engine rotation speed Ne rises. When the engine rotation speed Ne reaches the target rotation speed, the engine rotation speed Ne is maintained. With the rotation of the first output shaft 14 of the engine 10, the hydraulic oil in the engine 10 is agitated and the hydraulic oil is supplied to the sliding positions of the movable parts. Accordingly, by performing the motoring control, the sliding positions of the movable parts of the engine 10 are lubricated and the increase in friction loss of the engine 10 is suppressed.

At time t(2), the motoring control is finished (S112) when the coolant temperature Tw is equal to or higher than the threshold value B (YES in S110) and the current time passes through the charging finish time (YES in S114). Accordingly, the motoring control is switched from the ON state to the OFF state. The operation of the heating device 12 is stopped (the heating device 12 is changed to the OFF state).

In this way, in the vehicle 1 according to this embodiment, when the battery 70 is chargeable with the electric power from the external power source 302, the electric power from the external power source 302 can be supplied to the first MG 20 to rotate the first output shaft 14 of the engine 10. Accordingly, it is possible to rotate the first output shaft 14 of the engine 10 without consuming the electric power from the battery 70. With the rotation of the first output shaft 14 of the engine 10, the hydraulic oil in the engine 10 is agitated and the hydraulic oil is supplied to the sliding positions of the movable parts (for example, pistons in cylinders 112) of the engine 10, whereby it is possible to lubricate the sliding positions with the supplied hydraulic oil. Since the temperature of the hydraulic oil rises, the viscosity of the hydraulic oil can be improved. As a result, it is possible to provide a hybrid vehicle that can suppress an increase in friction loss in an engine when standing alone.

Since there is a high possibility that the vehicle 1 will be used after the charging finish time set by the user passes, it is possible to suppress the hydraulic oil at the lubricated sliding positions from running out until the vehicle is used, by supplying the electric power from the external power source 302 to the first MG 20 to rotate the first output shaft 14 of the engine 10. Since the performing time of the motoring control can be set to a minimum necessary time, it is possible to minimize the consumption of electric power.

By stopping the supply of electric power to the first MG 20 at the time point at which the charging finish time passes, it is possible to suppress discomfort given due to the operating state of the first MG 20 when the vehicle is used by the user after the charging finish time passes.

After the motoring control is finished, the effect of improvement in friction loss decreases with the lapse of time. Accordingly, by performing the motoring control up to the time point at which the charging finish time passes, the effect of improvement in friction loss can be kept longer after the charging finish time passes.

When the battery 70 is chargeable with the electric power from the external power source 302 and the coolant temperature Tw is equal to or lower than the threshold value A, there is a high possibility that the friction loss of the engine 10 will increase. Accordingly, by supplying the electric power from the external power source 302 to the first MG 20 to rotate the first output shaft 14, it is possible to lubricate the sliding positions of the movable parts of the engine 10 and to suppress an increase in friction loss of the engine.

When the charging finish time is not set by the user, the motoring control is not performed and it is thus possible to suppress unnecessary performing of the motoring control.

When there is provided an oil pump that is connected to the first output shaft 14 of the engine 10, that is operated with the rotation of the first output shaft 14, and that supplies the engine oil to the sliding positions of the movable parts, it is possible to more satisfactorily lubricate the sliding positions by performing the above-mentioned motoring control.

Modification Examples of this embodiment will be described below. This embodiment describes that the coolant temperature Tw of the engine 10 is detected as the temperature of the engine 10, but the detectable temperature of a peripheral part of the engine 10 may be detected as the temperature of the engine 10. For example, when the engine 10 is not operated and the standing-alone time of the vehicle 1 is sufficiently long, the outside air temperature To of the engine 10 may be detected as the temperature of the engine 10.

In this embodiment, the motoring control is performed without considering the elapsed time from the time point at which the engine 10 is stopped before the time point at which the charging with the electric power from the external power source 302 is started, but the motoring control may be performed when a predetermined time elapses after the engine 10 is stopped before the time point at which the charging with the electric power from the external power source 302. That is, the motoring control may be limited until a predetermined time elapses after the time point at which the engine 10 is stopped. According to this configuration, when the engine is stopped, the hydraulic oil at the sliding positions of the movable parts does not run out but remains until the predetermined elapses, and thus the increase in friction loss is suppressed. Accordingly, it is possible to suppress unnecessary performing of the motoring control.

This embodiment describes that the motoring control is performed using the electric power from the external power source 302 without considering the temperature TB of the battery 70 at the time of performing the motoring control, but the first MG 20 may be operated, for example, using at least one of the electric power from the external power source 302 or the electric power from the battery 70 depending on the temperature TB of the battery 70. For example, the electric power from the external power source 302 may be supplied to the first MG 20 to rotate the first output shaft 14 of the engine 10 when the temperature TB of the battery 70 is higher than a threshold value TB(0), and the electric power from the battery 70 may be supplied to the first MG 20 to rotate the first output shaft 14 when the temperature TB of the battery 70 is lower than the threshold value TB(0). When the electric power from the battery 70 is supplied to the first MG 20, the operation of the charging device 78 is stopped.

According to this configuration, when the temperature TB of the battery 70 is lower than the threshold value TB(0), the temperature of the battery 70 can be raised by operating the first MG 20 using the electric power from the battery 70. It is possible to improve the charging accepting characteristic at a low temperature by lowering the SOC which is the state of charge of the battery 70 by discharging the battery 70. When the temperature TB of the battery 70 is higher than the threshold value TB(0) or when the operation of the first MG 20 using the electric power from the battery 70 is maintained for a predetermined period of time, at least one of the operation of the first MG 20 or the charging of the battery 70 using the electric power from the external power source 302 may be performed. It is possible to further raise the temperature of the battery 70 by charging the battery 70.

This embodiment describes that only the first MG 20 is operated when the battery 70 is chargeable with the electric power from the external power source 302, but the air conditioner 80 along with the first MG 20 may be operated to perform ventilation up to the charging finish time so as to complete the ventilation of the interior at the charging finish time, or to cool or heat the interior up to the charging finish time so that the temperature of interior reaches a target temperature.

In this case, when the battery 70 is chargeable with the electric power from the external power source 302 and both the first MG 20 and the air conditioner 80 are operated, it is preferable that the motoring control be performed using at least one of the electric power from the external power source 302 or the electric power from the battery 70 depending on the state of the battery 70.

For example, when the battery 70 is chargeable with the electric power from the external power source 302, both of the first MG 20 and the air conditioner 80 are operated, and the acceptable value of a charging current of the battery 70 is smaller than a predetermined value, the SOC of the battery 70 is high and thus the motoring control may be performed using the electric power from the battery 70. When the acceptable value of the charging current of the battery 70 is larger than the predetermined value, the SOC of the battery 70 is low and thus the motoring control may be performed using the electric power from the external power source 302. The acceptable value of the charging current is calculated, for example, on the basis of a map in which the temperature TB of the battery 70, the SOC of the battery 70, and the relationship of the temperature TB, the SOC, and the acceptable value of the battery 70 are defined. For example, in a low-temperature environment, the lower the temperature TB of the battery 70 becomes, the smaller the acceptable value of the charging current is calculated to be. The higher the SOC of the battery 70 becomes, the smaller the acceptable value of the charging current is calculated to be.

Alternatively, when the battery 70 is chargeable with the electric power from the external power source 302, both of the first MG 20 and the air conditioner 80 are operated, and the acceptable value of a discharging current of the battery 70 is larger than a predetermined value, the SOC of the battery 70 is high and thus the motoring control may be performed using the electric power from the battery 70. When the acceptable value of the charging current of the battery 70 is smaller than the predetermined value, the SOC of the battery 70 is low and thus the motoring control may be performed using the electric power from the external power source 302. The acceptable value of the discharging current is calculated, for example, on the basis of a map in which the temperature TB of the battery 70, the SOC of the battery 70, and the relationship of the temperature TB, the SOC, and the acceptable value of the battery 70 are defined. For example, in a low-temperature environment, the lower the temperature TB of the battery 70 becomes, the smaller the acceptable value of the discharging current is calculated to be. The lower the SOC of the battery 70 becomes, the smaller the acceptable value of the discharging current is calculated to be.

When the battery 70 is chargeable with the electric power from the external power source 302, both of the first MG 20 and the air conditioner 80 are operated, and the temperature TB of the battery 70 is lower than a predetermined value, the temperature TB of the battery 70 is raised and thus the motoring control may be performed using the electric power from the battery 70. When the temperature TB of the battery 70 is higher than the predetermined value, the motoring control may be performed using the electric power from the external power source 302.

When the battery 70 is chargeable with the electric power from the external power source 302, both of the first MG 20 and the air conditioner 80 are operated, and the SOC of the battery 70 is higher than a predetermined value, the motoring control may be performed using the electric power from the battery 70. When the SOC of the battery 70 is lower than the predetermined value, the motoring control may be performed using the electric power from the external power source 302.

According to this configuration, by performing the motoring control using at least one of the electric power from the external power source 302 or the electric power from the battery 70 depending on the state of the battery 70, it is possible to appropriately supply electric power to the first MG 20 at the time of performing the motoring control.

When the battery 70 is fully charged, the supply of electric power from the external power source 302 is possible (that is, the charging plug 300 is attached to the vehicle 1), and the operation of the air conditioner 80 before the charging finish time is set by the user, the motoring control may be performed using the electric power from the external power source 302 at the charging finish time. Since the motoring control is performed until the charging finish time passes, the effect of improvement in friction loss can be maintained longer after the charging finish time passes.

This embodiment describes that the charging of the battery 70 and the operation of the first MG 20 (or the charging of the battery 70, the operation of the first MG 20, and the operation of the air conditioner 80) are possible in a state in which the battery 70 is chargeable with the electric power from the external power source 302, but the first MG 20 may be operated (or the first MG 20 and the air conditioner 80 may be operated) using at least one of the electric power from the external power source 302 or the electric power from the battery 70, for example, depending on the power supply capability from the external power source 302.

For example, when a possible amount of power to be supplied to the vehicle 1 and included in limit information received from the power management system 306 is greater than a predetermined value, the ECU 200 may operate the first MG 20 (or the first MG 20 and the air conditioner 80) using the electric power from the external power source 302. The predetermined value is, for example, an amount of power with which the first MG 20 (or the first MG 20 and the air conditioner 80) can be operated. When a possible amount of power to be supplied to the vehicle 1 and included in the limit information received from the power management system 306 is less than a predetermined value, the ECU 200 may operate the first MG 20 (or the first MG 20 and the air conditioner 80) using the electric power from the external power source 302 and the electric power from the battery 70, may operate the first MG 20 using the electric power from the battery 70, or may reduce the degree of operation of the air conditioner 80.

According to this configuration, when the power supply capability from the external power source 302 varies, for example, when the current time is a time in a peak time zone of the amount of power used, the first MG 20 may be sufficiently supplied with electric power using only the electric power from the external power source 302 and it is thus possible to appropriately supply electric power to the first MG 20 by performing the motoring control using at least one of the electric power from the external power source 302 or the electric power from the battery 70 depending on the power supply capability from the external power source 302 or lowering the amount of power used of other electrical devices such as the air conditioner 80.

This embodiment describes that the heating device 12 is operated at the same time as performing the motoring control, but the heating device 12 may not be operated.

This embodiment describes that a period until it is predicted that the coolant temperature Tw is equal to or higher than the threshold value B at the charging finish time after the operation of the heating device 12 is started is set as a predetermined time for determining the motoring start time, but the predetermined time may be set to a time varying depending on the outside air temperature or temperature prediction information based on dates or the like or may be set to a time in which the hydraulic oil in the engine 10 is agitated by the motoring and the sliding positions of the movable parts can be sufficiently lubricated.

This embodiment describes that the operation start timing of the heating device 12 and the start timing of the motoring control are equal to each other, but the operation start timing of the heating device 12 and the start timing of the motoring control may be different from each other.

This embodiment describes that the engine rotation speed Ne is raised to the target rotation speed at the time of performing the motoring control, but the rotation speed of the first MG 20 may be raised to the target rotation speed.

The ECU 200 can detect the rotation speed of the first MG 20, for example, using a resolver disposed in the first MG 20.

This embodiment describes that the motoring control is finished at the charging finish time set by the user, but the motoring control may be finished at the time point at which the charging with the electric power from the external power source 302 is completed.

This embodiment describes that the motoring control is finished at the charging finish time, but it may be determined using a predetermined method whether the friction loss of the engine 10 is improved, for example, at the time of finishing the motoring control.

For example, on the basis of the variation in electric power supplied to the first MG 20 when a predetermined rotation command is given just before the motoring control is finished or after the motoring control is finished, it may be determined whether the friction loss of the engine 10 is improved. With the improvement in friction loss by the feedback control, the electric power required for the predetermined rotation command decreases and converges on predetermined electric power. Accordingly, for example, when the electric power supplied to the first MG 20 after the predetermined rotation command is given is lower than a threshold value or when the variation in electric power supplied to the first MG 20 is lower than the threshold value, it may be determined that the friction loss of the engine 10 is improved.

Alternatively, on the basis of the variation in the engine rotation speed Ne (or the rotation speed of the first MG 20) when constant electric power is supplied to the first MG 20 just before the motoring control is finished or after the motoring control is finished, it may be determined whether the friction loss of the engine 10 is improved. With the improvement in friction loss of the engine 10, the engine rotation speed Ne for the constant electric power increases and converges on a predetermined rotation speed. Accordingly, for example, when the engine rotation speed Ne after the predetermined rotation command is given to the first MG 20 is higher than a threshold value or when the variation in the engine rotation speed Ne is lower than the threshold value, it may be determined that the friction loss of the engine 10 is improved. The above-mentioned modification examples may be embodied by combination of all or a part thereof.

It should be understood that the above-mentioned embodiment is only an example from all points of view, and is not restrictive. The scope of the invention is represented by the appended claims, not by the above description, and includes all modifications within the same meaning and scope equivalent to the appended claims.

What is claimed is:

1. A hybrid vehicle comprising:
   an engine;
   a rotary electric machine connected to an output shaft of the engine;
   an electric storage device configured to supply electric power to a drive source of the hybrid vehicle and to be chargeable with electric power from an external power source, the external power source being disposed outside the hybrid vehicle;
   an air conditioner configured to adjust a temperature of an interior of the hybrid vehicle; and
   an electronic control unit configured to:
   supply the electric power from the external power source to the rotary electric machine such that the output shaft is rotated when the electric storage device is chargeable with the electric power from the external power source, the air conditioner is operated along with the rotary electric machine, and a state of the electric storage device is greater than a predetermined value, and supply the electric power from the electric storage device to the rotary electric machine such that the output shaft is rotated when the electric storage device is chargeable with the electric power from the external power source, the air conditioner is operated along with the rotary electric machine, and the state of the electric storage device is less than the predetermined value.

2. The hybrid vehicle according to claim 1, wherein the electronic control unit is configured to finish charging of the electric storage device with the electric power from the external power source at a charging finish time, and supply the electric power from the external power source to the rotary electric machine such that rotation of the output shaft is started at a time prior by a predetermined time to the charging finish time, the charging finish time being a time at when the charging of the electric storage device with the electric power from the external power source is finished.

3. The hybrid vehicle according to claim 2, wherein the charging finish time is a time set in advance in the hybrid vehicle.

4. The hybrid vehicle according to claim 3, wherein the charging finish time is a time set by a user.

5. The hybrid vehicle according to claim 1, wherein the electronic control unit is configured to finish charging of the electric storage device with the electric power from the external power source at a charging finish time, and supply the electric power from the external power source to the rotary electric machine such that the output shaft is rotated when the charging finish time is set by a user and the electric storage device is chargeable with the electric power from the external power source.

6. The hybrid vehicle according to claim 1, wherein the electronic control unit is configured to stop supply of electric power to the rotary electric machine at a charging finish time.

7. The hybrid vehicle according to claim 1, further comprising:

a first detector configured to detect a temperature of the engine, wherein the electronic control unit is configured to supply the electric power from the external power source to the rotary electric machine such that the output shaft is rotated when the electric storage device is chargeable with the electric power from the external power source and the temperature of the engine is lower than a threshold value, the temperature of the engine being detected by the first detector.

8. The hybrid vehicle according to claim 1, wherein the electronic control unit is configured to supply the electric power from the external power source to the rotary electric machine such that the output shaft is rotated when the electric storage device is chargeable with the electric power from the external power source and a predetermined time elapses after the engine is stopped.

9. The hybrid vehicle according to claim 1, further comprising:

a second detector configured to detect a temperature of the electric storage device, wherein the electronic control unit is configured to supply the electric power from the external power source to the rotary electric machine such that the output shaft is rotated when the electric storage device is chargeable with the electric power from the external power source and the temperature of the electric storage device is higher than a threshold value, and supply electric power from the electric storage device to the rotary electric machine such that the output shaft is rotated when the electric storage device is chargeable with the electric power from the external power source and the temperature of the electric storage device is lower than the threshold value, the temperature of the electric storage device being detected by the second detector.

10. The hybrid vehicle according to claim 1, wherein the electronic control unit is configured to supply at least one of the electric power from the external power source or electric power supplied from the electric storage device to the rotary electric machine such that the output shaft is rotated depending on an amount of power capable of being supplied from the external power source when the electric storage device is chargeable with the electric power from the external power source.

11. The hybrid vehicle according to claim 1, wherein a state of charge of the electric storage device is higher when the state of the electric storage device is less than the predetermined value compared to the state of charge of the electric storage device when the state of the electric storage device is greater than the predetermined value.

12. The hybrid vehicle according to claim 11, wherein as the state of charge of the electric storage device increases the state of the electric storage device decreases.

13. The hybrid vehicle according to claim 1, wherein the state of the electric storage device is an acceptable value of a charging current of the electric storage device.

14. The hybrid vehicle according to claim 1 further comprising:

a temperature sensor that detects a temperature of the electric storage device, wherein the electronic control unit determines the state of the electric storage device based on the temperature of the electric storage device and a state of charge of the electric storage device.

* * * * *